Dec. 10, 1957     D. E. BROUSSARD     2,815,578
WELL BORE CALIPERING AND TELEMETERING SYSTEM
Filed Dec. 10, 1956     3 Sheets—Sheet 1

INVENTOR:
DOUGLAS E. BROUSSARD
BY: *[signature]*
HIS ATTORNEY

Dec. 10, 1957  D. E. BROUSSARD  2,815,578
WELL BORE CALIPERING AND TELEMETERING SYSTEM
Filed Dec. 10, 1956  3 Sheets-Sheet 2

INVENTOR:
DOUGLAS E. BROUSSARD
BY:
HIS ATTORNEY

Dec. 10, 1957  D. E. BROUSSARD  2,815,578
WELL BORE CALIPERING AND TELEMETERING SYSTEM
Filed Dec. 10, 1956  3 Sheets-Sheet 3

INVENTOR:
DOUGLAS E. BROUSSARD
BY:
HIS ATTORNEY

United States Patent Office 2,815,578
Patented Dec. 10, 1957

2,815,578

WELL BORE CALIPERING AND TELEMETERING SYSTEM

Douglas E. Broussard, Bellaire, Tex., assignor to Shell Development Company, New York, N. Y., a corporation of Delaware Application December 10, 1956, Serial No. 627,271

7 Claims. (Cl. 33—178)

This invention pertains to oil well apparatus and relates, more particularly, to a telemetering system for measuring and recording dimensions, or temperature or pressure conditions or other variable physical conditions or quantities in well boreholes, production tubing and the like.

An object of this invention is to provide a new and improved relatively low cost telemetering system including a sub-surface unit for sensing the quantity to be measured and transmitting a measurement signal, and a surface recording unit by means of which a record of measurements is made immediately available to the operator.

The apparatus of the present invention is particularly adapted for use as a caliper logging system for determining and recording measurements relating to the configuration of the wall of a borehole or of tubing within a borehole.

Preferably, the sub-surface unit or caliper of such a system should be constructed to withstand relatively high pressures while being small enough to pass through relatively small diameter production tubing. Also, since in many cases the squeezing and releasing which a cable is subjected to by devices used for running cables into, for example, high pressure wells, quickly damages multi-conductor cables, the caliper preferably should be connected to the surface apparatus by an armored single-conductor cable.

For the most part, the data obtained heretofore from a single run of a calipering device did not provide sufficient information, and usually a number of runs had to be made before a well bore, for example, was logged. In many cases this circumstance resulted from the inability to combine with and incorporate into a single-conductor type, small-sized calipering device suitable apparatus to provide the desired information in a single run. Moreover, the information obtained generally related only to the cross-section of the borehole instead of to its actual configuration. Since the configuration can change without an appreciable change in cross-sectional area, for example, a borehole wall or a tubing section can be compressed into an oval without appreciably changing its cross-sectional area, the information obtained was often misleading.

Accordingly, another object of this invention is to provide a new and improved telemetering system including a small, single-conductor type sub-surface unit by means of which a more complete record of measurements relating to the actual configuration of a borehole or tubing section can be obtained, and a surface recording unit by means of which a record of measurements is made immediately available to the operator.

Other objects and advantages will become apparent from the folowing description taken in connection with the accompanying drawings wherein.

Figures 1, 4:
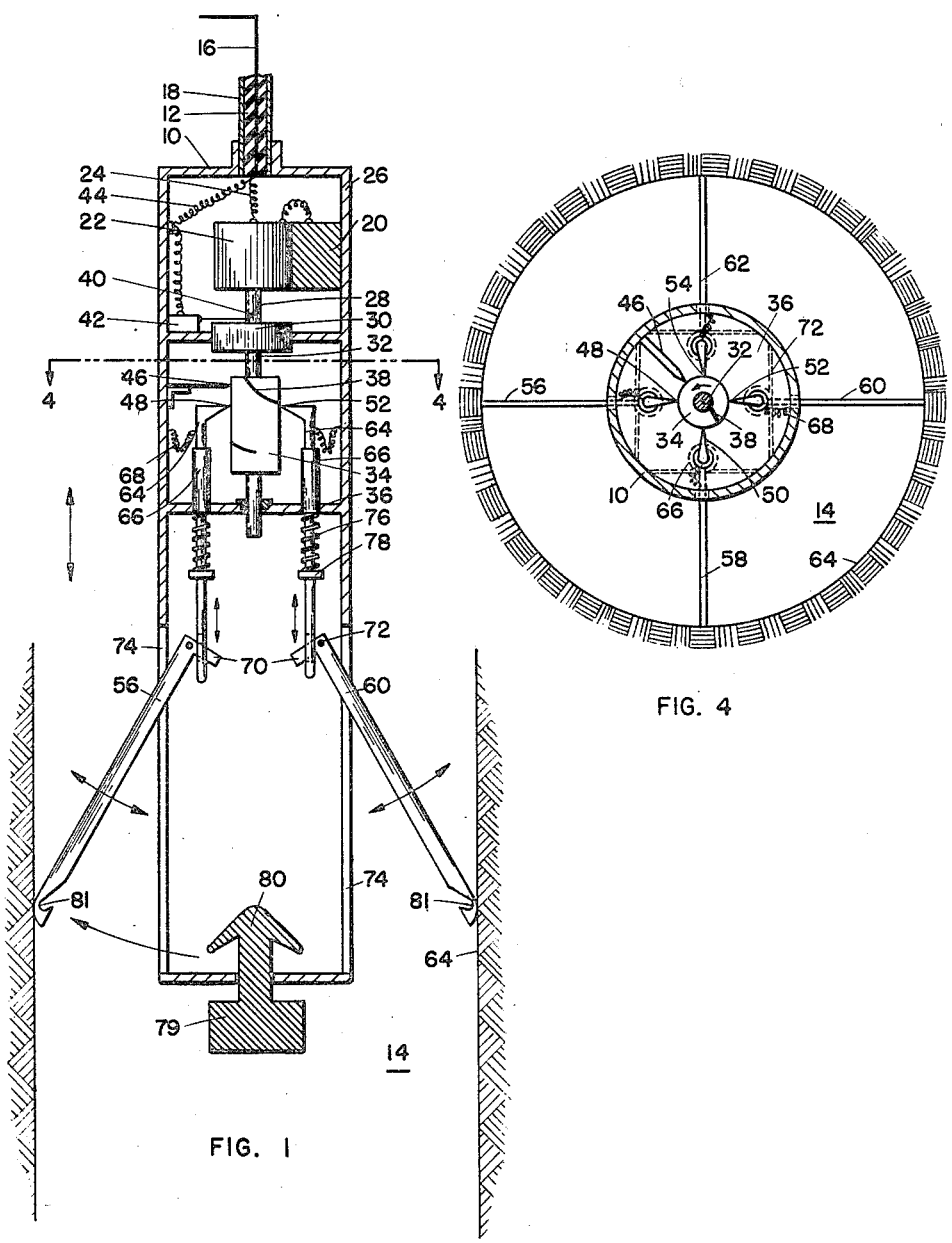
Fig. 1 is a diagrammatic view illustrating the sub-surface portion of the apparatus of the present invention.
Fig. 4 is a diagrammatic view taken in section along the line 4—4 of Fig. 1.

As an illustration of one embodiment of this invention, the present telemetering system is shown and described as a system for determining and recording measurements relating to the configuration of a borehole or pipe section. Referring to Fig. 1, the subsurface apparatus or logging device of the present calipering and telemetering system comprises a housing 10 which is shown attached in a fluid tight manner to a cable 12 by means of which it is moved through a borehole 14. Although an insulated multiconductor cable may be used, it is preferred to use an insulated cable having a single electrical conductor 16 embedded therein. The cable 12 is provided with a conductive metallic sheath 18 which is in contact with the housing 10 and the fluid in the well or borehole 14. The sheath 18 forms the return lead of the circuit by means of which operating electric energy is supplied to the housing and signals are relayed from the housing to the surface, as is subsequently more fully described.

The housing 10 is preferably made of a plurality of cylindrical or streamlined metallic sections connected with each other by suitable screw threads or other means to permit easy access to the inside thereof; for simplicity, however, the housing is diagrammatically shown in the drawing as a single shell. The size of the housing may be varied in accordance with the purposes for which it is intended. For uses in relatively restricted places, such as well tubing or pipe, it is possible to construct the housing with a very small outside diameter, such, for example as 1¼ inches.

Held within the housing by any desired means, for example, by being screw threaded within the housing or attached thereto by means such as diagrammatically represented by a bracket 20, is a small alternating current synchronous motor 22, having one of its terminals connected to the conductor 16 by a lead 24, and the other terminal grounded to the housing, as diagrammatically shown at 26.

The motor shaft 28 is connected to a gear reduction unit 30 having, for example, a 20:1 ratio. The low speed shaft 32 of the unit is fixed to and extends axially through an insulated drum 34 and is journaled at its lower end in an insulated bearing in a transverse partition 36 which effectively seals the upper part of the housing from the fluid in the borehole or well 14. The drum carries, for example, on its outer surface, at least a one pitch helical conductor 38 which may be formed of copper or other suitably conducting material, the helix 38 being arranged co-axially with the drum for rotation therewith about the drum axis. At its upper end the helix 38 is electrically connected by the use of a brush and a slip ring (not shown), or other means well known in the art, through the low-speed shaft 32 and the motor shaft 28 to a contact 40 serving as a terminal for a pulse circuit compartment 42 which is electrically connected through a lead 44 to the cable conductor 16, the shafts 32 and 28 being insulated from the housing 10.

Rotation of the drum 34 causes the helix 38 to contact cyclically a fixed reference element or pointer 46, and a plurality, for example, four movable indicating elements or contacts 48, 50, 52 and 54, each of which successively connects a low resistance across the cable circuit which momentarily shorts the circuit and transmits a signal or pulse up the cable 12 to recording apparatus at the surface of the ground. For illustrative purposes, only the contacts 48 and 52 are shown in Fig. 1, the arrangement of the four contacts, which is subsequently more fully described, being shown in Fig. 4.

The contacts and the pointer 46 are all preferably mounted on resilient stems or arms so that a good electrical contact may be had with the helix. The stem of the pointer 46 comprises a low resistance conductor which is attached to the housing 10 and is thereby grounded. The contacts 48, 50, 52 and 54 are disposed in continuous sliding engagement with the sides of the drum 34 and are mechanically linked to four probes 56, 58, 60 and 62, respectively, which extend through slots in the housing 10 and ride along the borehole wall 64, the linkage mechanisms being such that each contact moves axially of the helix in response to the lateral movement of its probe. Each contact is also electrically connected to the housing 10 and is thereby grounded.

Since the construction of each contact, linking mechanism and probe is identical, only the mechanism associated with the contact 52 is subsequently described in detail. As shown in Fig. 1, the contact 52 is carried by an arm 64 which is shiftable axially with respect to the drum 34 through a sleeve 66 carried by the partition 36. The arm 64 comprises a low resistance conductor to ground such, for example, as a lead 68 attached to the housing 10. At its lower end, the arm is provided with an eye which receives the crank arm 70 of the probe 60 which probe is pivotally connected to the housing 10 by a pin 72 disposed transversely with respect to the rotary axis of the helix 38. The arm 64 is biased by a spring 76 in compression between the sleeve 66 and a collar 78, which is fixed to the arm, to urge the probe 60 through the slot 74 in the housing 10 and into engagement with the borehole wall. The linkage between the contact 52 and the probe 60 is such, that, for any expected deflection of the probe, the contact will not be shifted axially of the helix 38 beyond the limits defined by the one pitch length of the helix.

The housing 10 includes also a slidable latch having a weight 79 and a grooved head 80 which cooperates with the notches 81 on the lower ends of the probes to lock them into retracted positions when the housing is lowered through the borehole, and operates to release the probes into expanded positions (Fig. 1) when the weight is shifted upwardly by contact with the bottom of the borehole. It is understood that within the scope of the present invention various types of latch means may be provided for selectively expanding or retracting the probes at any depth in the borehole and that the probes may be constructed and arranged to operate in an expanded position when the housing is being moved through the borehole in either direction.

At the surface of the ground, the cable 12 is wound or unwound from a suitably powered reel 84, the conductor 16 being connected to a source of electric energy by any suitable device as, for example, a slip ring 85 and brush 86.

Figure 2:
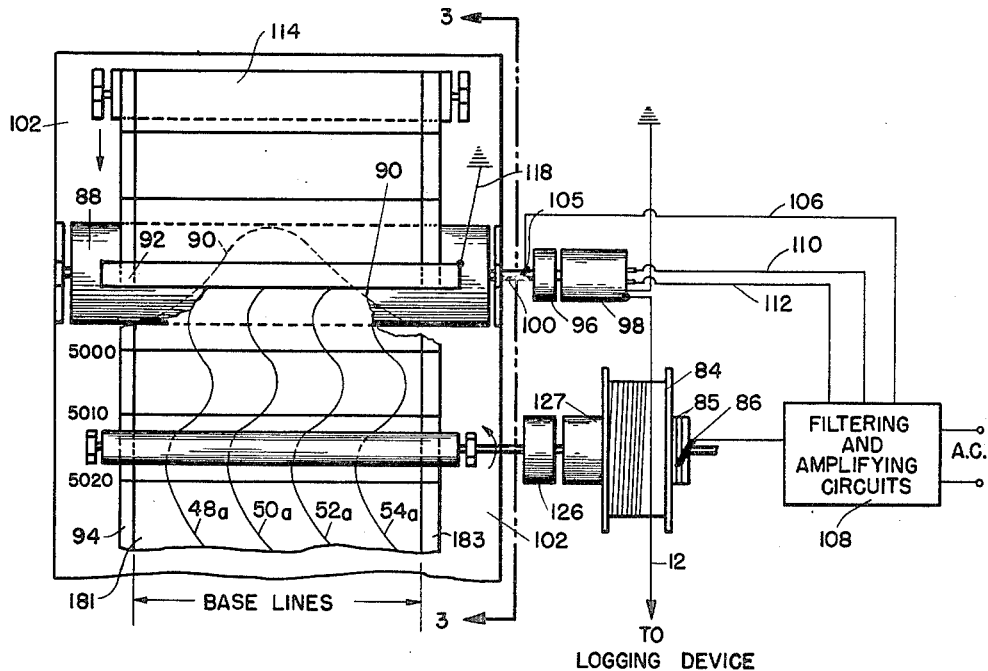
Fig. 2 is a diagrammatic view illustrating the surface portion of the apparatus of the present invention.

As diagrammatically shown in Fig. 2, the recording apparatus comprises an insulated recording drum 88 including a helical conductor 90 which is electrically connected to the cable conductor 16 and is rotated with the drum 88 in synchronism with the transmitting drum 34 and helix 38. The terms, "In synchronism" or "synchronized" are used herein to denote a condition wherein the helix 90 of the recording system rotates at a speed which is equal to that of the helix 38 of the measuring system, or which stands in an integral ratio thereto, whereby the same events stand always in the same phase angle relationship in the measuring and the recording systems. The helix 90 forms one terminal of an electrical circuit which includes as its other terminal an electrically grounded marking element or bar 92 which is disposed in a fixed position parallel to the axis of rotation of the drum and helix 90. Each signal from the helix 38 on the transmitting drum causes a current or spark to pass between the recording helix 90 and the marking element 92 at their point of intersection, which spark marks a sheet of electrosensitive paper 94 which is moved across the drum 88 and between the helix 90 and the element 92 at a speed proportional to the speed at which the logging device is moved through the borehole.

More particularly, the recording drum 88 is rotated through a speed reduction unit 96 by a synchronous motor 98 having the same electrical characteristics and driven from the same source of A. C. as the synchronous motor 22 in the housing 10. The gear reduction unit 96 preferably has the same ratio as the unit 30 in the housing 10, and its low-speed shaft 100 on which the drum 88 is mounted is preferably synchronized to rotate at the same speed as the low-speed shaft 32 in the housing 10. The helical conductors 38 and 90 also preferably have the same geometric shape except, if desired, that the recording helix 90 can be made slightly longer than 1 pitch length so that its opposite ends simultaneously intersect the marking element 92 for a purpose subsequently described.

Figure 3:
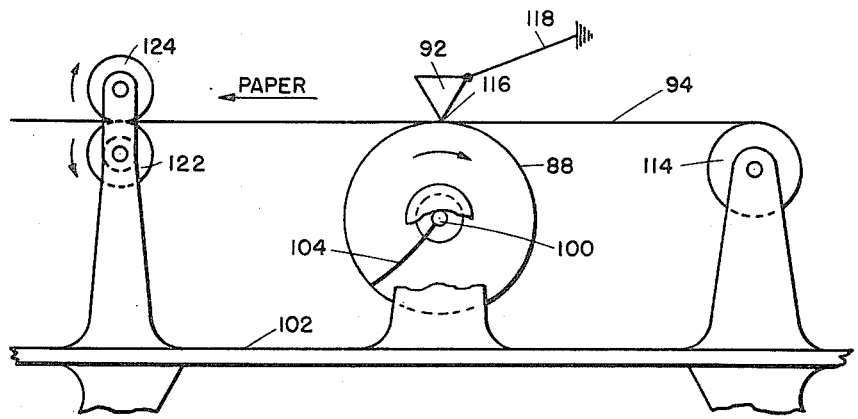
Fig. 3 is an enlarged diagrammatic view taken in section along the line 3—3 of Fig. 2.

The motor and gear reduction unit shafts are insulated from ground, the shaft 100 being journaled, for example, in the insulated bearings of a stand 102. The helix 90 is electrically connected to the low-speed shaft 100 by a lead 104 (Fig. 3), and the shaft 100 is electrically connected by a conductor 106 and a slip ring and brush device 105 through a filtering and amplifying circuit unit 108 to the cable conductor 16. The motor 98 is connected to the A. C. source through the same unit 108 by a pair of conductors 110 and 112.

Rotatably mounted on the stand 102 to one side of the drum 88 is a roll 114 of the electrosensitive recording paper 94. The paper may be of any suitable type such, for example, as one of the electrolytic recorder papers (described in "Industrial and Engineering Chemistry" for October, 1947, page 1286) which has been chemically treated so that a current or spark passing through it produces a mark in the form of a dot. The paper 94 is passed over the upper surface of the drum 88 and is pressed into engagement with it and thus the helix 90 by the under edge 116 of the marking element 92 which edge is disposed parallel to the axis of rotation of the helix 90. The marking element 92 is grounded, for example, by a lead 118, and the contact edge 116 is preferably urged against the paper by a resilient support (not shown) to which the marking element is attached.

At the other side of the drum 88, the paper 94 passes between a lower pressure roller 122 and an upper drive roller 124, both of which are mounted on the stand 102. The upper drive roller 124 is mounted on the shaft of a Selsyn motor 126 which is operated from a Selsyn generator 127 connected to the reel 84, in a manner well known in the art, to energize the motor 126 and thus move the paper past the contact edge 116 at a speed proportional to the speed at which the housing 10 is moving through the borehole.

Figure 5:
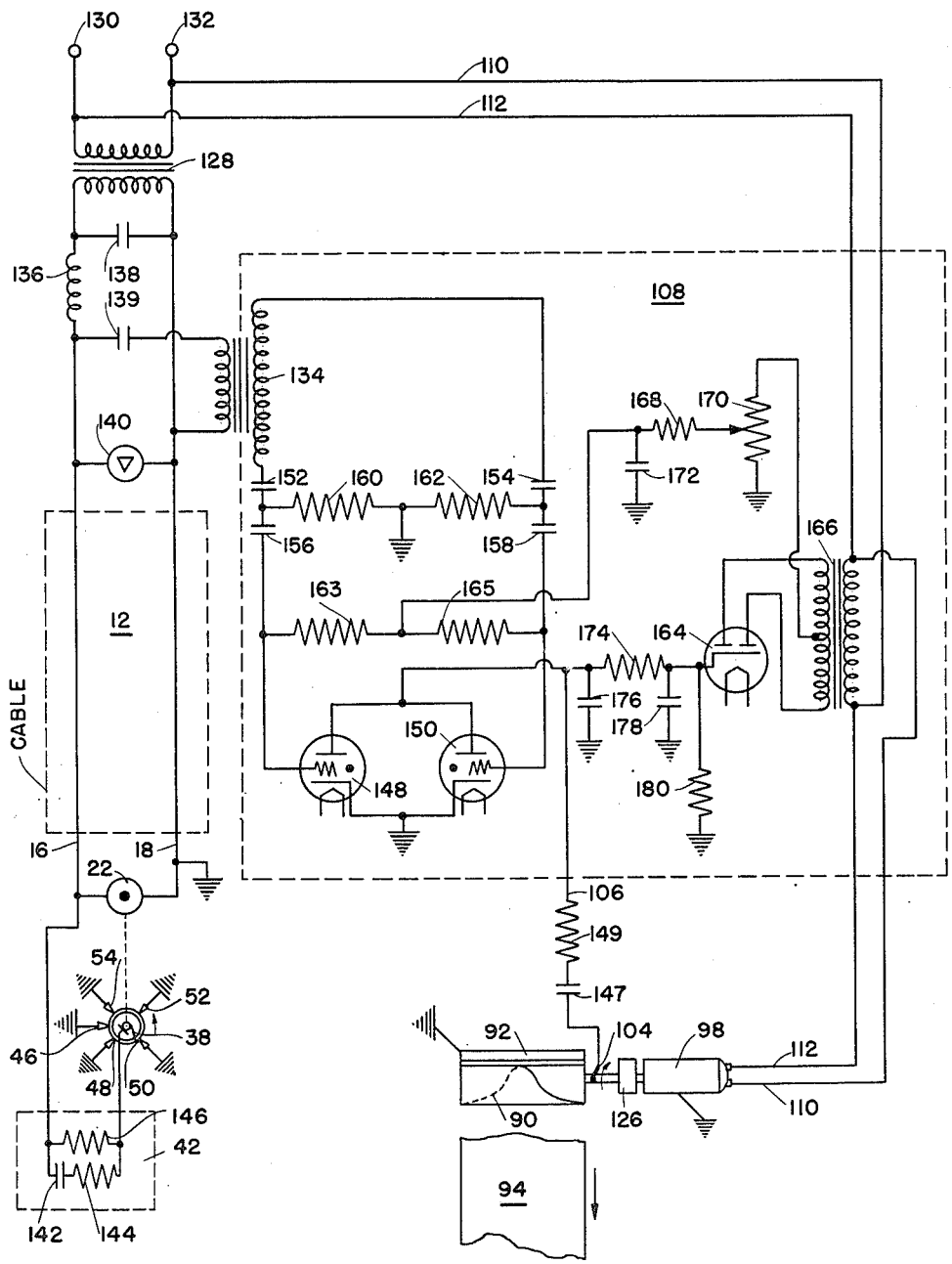
Fig. 5 is a diagram of the electrical circuit of the present system.

Fig. 5 is a schematic diagram of the electrical circuits combining the elements of Figs. 1 and 2, the same numerals being used throughout to designate the same elements.

Electric energy is supplied through a transformer 128 from the terminals 130 and 132 of any suitable source, such as a regular A. C. power supply line of about 110–120 volts, and 50–60 cycles.

This energy is transmitted to the subsurface elements within the housing 10 through the cable 12, and to the surface circuits, in the unit 108 through an insulated transformer 134.

A low-pass filter comprising, for example, an inductance 136 and condensers 138 and 139 is used to prevent the subsurface signals from passing through the power line. A voltmeter 140 may be used to measure the voltages between the two leads formed by the conductors 16 and the return sheath 18 of the cable 12.

The subsurface portion of the system comprises essentially the elements already described with regard to Fig. 1.

The pulse circuit 42 may comprise, for example, a condenser 142 and resistance 144 connected in parallel with a resistance 146 across the motor 22.

The surface portion of the system comprises the synchronous motor 98 and the recording helix 90 and the marker bar 92, described with regard to Fig. 1. The helix 90 is electrically connected to the unit 108 by the conductor 106 through a capacitor 147 connected in series with a resistor 149. Leads 110 and 112 are used to drive the motor 98 of the surface recording equipment in synchronism with the subsurface motor 22.

The filtering and amplifying circuits of the unit 108 comprise essentially thyratron tubes 148 and 150 connected in parallel in such a manner that only one tube is firing at any moment. This may be accomplished in any desired manner well understood by those skilled in the art, using either A. C. or D. C. excitation for the thyratron tubes. A preferred arrangement will be briefly described with regard to Fig. 5 insofar as is necessary to understand the operation of the present invention.

Signals from the subsurface portion of the system are impressed on the grids of the thyratron tubes 148 and 150 through the transformer 134 and a high pass filter system comprising condensers 152, 154, 156 and 158 and resistances 160 and 162 having a ground therebetween and connected in parallel with resistances 163 and 165.

Excitation is provided for the thyratron tubes 148 and 150 from any source of direct current, for example, from a rectifier tube 164 energized from terminals 130 and 132 through a tapped transformer 166. The anode of the rectifier 164 is connected to the grids of tubes 148 and 150 through a resistance 168 forming a potentiometer connection between a grounded resistance 170 and a grounded filter condenser 172. The cathode of rectifier 164 is connected to the plates of tubes 148 and 150 through a lead comprising a resistance 174 between grounded condensers 176 and 178 and a parallel grounded high resistance 180, having a value such as a megohm, resistance 174 and condenser 176 forming a relaxation extinction circuit. It will thus be seen from Fig. 5 that this arrangement provides a relaxation extinction circuit for the thyratron tubes and a bleeder circuit for the rectifier.

In operation the probes are latched into their retracted positions and the housing is lowered into the borehole until the latch contacts the bottom of the borehole, or is otherwise caused to permit the probes to expand into contact with the borehole wall. The system is then energized and a log is taken as the housing is moved upwardly through the borehole.

More particularly, as previously noted, the drums and thus the helixes are preferably rotated at exactly the same rate of speed, the helix 38 rotating, for example, in a clockwise direction as viewed from its lower end, and the helix 90 rotating in a clockwise direction (a direction opposite to the movement of the recording paper 114) as viewed from its driven end. Also, the helixes are matched or rotated in phase such that when the helix 38 contacts the pointer 46, the opposite ends of the helix 90 simultaneously intersect the under edge 116 of the marker bar 92. Thus the periodic signal occurring from contact between the helix 38 and the pointer 46 causes a pair of parallel reference base lines 181 and 183 exactly one pitch length apart to appear on the paper 94. As long as the helixes stay in phase, the base lines are straight and immobile and are generally easily identified. If desired, additional identification may be provided by, for example, causing the reference pointer to transmit a characteristic pulse by arranging a cam to lift the pointer 46 off the drum every other revolution, or by providing the pointer with a two pointed contact whereby each base line would appear as a double trace line.

As shown in Fig. 4, the probes 56 and 60 are arranged in diametrically opposite positions, as are the probes 58 and 62. Also the probes are equally angularly spaced, and the probe contacts 48, 50, 52 and 54 are similarly spaced at 90° intervals around the periphery of the drum. As the housing 10 moves upwardly in the borehole, the probes flex or move inwardly and outwardly in accordance with the contour of the borehole. It may be seen that the change in position of each probe causes its contact to move a proportionate distance axially of the rotating helix and thus effect a change in its linear displacement with respect to the position of the fixed reference contact. As the helix rotates it cyclically contacts the pointer and the contacts a predetermined number of times, for example, 3 times each second, the resulting pulses being transmitted by the telemetering ssytem and applied to form a record on the electrosensitive paper at the surface of the ground, the pulses from the fixed contact 46 appearing as the reference lines 181 and 183 and the pulses from the probe contacts appearing as four separate trace lines. The trace lines may be identified with their respective probe contacts and probes from the relative positions of the trace lines, which over a period of time generally tend to assume equally spaced positions on the paper 114. Also over a period of time, the trace lines may be identified by the order of their positions with respect to, for example, the base line 181. For example, when the contacts 48, 50, 52 and 54 are all disposed at the upper end of the drum 34 and the fixed pointer 46 is arranged at the upper end of the drum between the contacts 54 and 48, the helix 38, after closing with the fixed pointer, successively closes with the contacts 48, 50, 52 and 54 and the traces 48a, 50a, 52a and 54a appear in the order shown in Fig. 2 with reference to the base line 181.

From the foregoing, it may be seen that the transmitting helix operates to translate or convert the variations in linear displacement of each probe contact (with respect to the fixed pointer) into varying time signals representing each displaced position of each probe contact, the time signals from each probe contact being converted by the recording helix into a visual record appearing as a separate trace on the paper 94.

By graphically providing the paper with an ordinate axis marked off at intervals spaced proportionally to the rate of travel of the paper 94 and to vertical displacement of the housing 10 and representing predetermined depth intervals, the traces can be correlated with the depths at which the mark producing signals were transmitted from the borehole.

The type of log obtained depends upon the method followed for interpreting the record. For example, if a rough log is desired, it may be assumed that the housing axis moves along the borehole axis, thus the deflection of each probe may be considered with respect to the borehole axis, and the record may be provided with an abscissa axis set off in units converting the linear displacement of the probe contacts into the actual substantially radial distance moved through by the probes and expressed, for example, in inch units. Since the probes 56 and 60; and 58 and 62 are diametrically opposed, two diameter measurements can be readily calculated (at any selected depth) by determining the change in position of each trace line with respect to the base line 181 (measured along the abscissa axis) from the known position occupied by the trace line (measured in the same manner) when the probe it represents is disposed a certain known radial distance from the axis of the housing (and thus the borehole axis), algebraically combining the difference values (determined from the abscissa axis) representing the changes in position of each pair of diametrically opposed probes to determine a net change in the diameter measured by each pair of probes when in the known positions, and algebraically combining the net changes with the respective known diameters to give the two diameters of the borehole at the selected depth. For most purposes, the results obtained in this manner are sufficiently accurate since the probes tend to center the housing substantially in the center of the borehole. However, if desired, a more accurate log can be taken by using a larger number of probes and calculating from the recorded data the radial position of each probe from the axis of the housing to provide a more accurate determination of the configuration of the borehole. Conversely, using only three and even two probes may sometimes be found sufficient.

In embodiments of the logging device using a small number of probes, for example, two to four probes, two of the diametrically opposed probes, for example, the probes 58 and 62 are preferably provided with relatively strong springs 76 while any additional probes are provided with relatively weak springs. Since the housing 10 can twist around the cable 12, the stronger springs tend to twist the housing so that their probes measure the maximum diameters of the borehole or pipe section.

In a preferred method of operating the present system the probe-contacts are spaced at equal intervals around the circumference of the helix 38. The mechanisms linking the contacts and probes are adjusted so that when the housing 10 is centered and the probes are expanded in a cylinder of substantially the same diameter as the borehole or pipe section which is to be logged, the probe-contacts lie on a circle passing through the center of the helical conductor 38 so that the recorded trace lines of the probe contacts are equally spaced between the base lines 181 and 183 in normal positions representing a normal radial expansion of the probes. By then providing each trace with a separate base line coinciding with the normal position of the trace, deviations of each trace from its base line can be recorded and variations in each radius from the normal can readily be determined.

The comprehensiveness of the data recorded depends upon the arrangement and number of the probes which are used. It may be seen, that since the probe contacts move axially of the transmitting helix they move along non-interferring parallel paths, and the number of measurements which can be recorded is limited only by the number of probe contacts which can be arranged circumferentially around the drum 34. This is an important feature of the present inventions, since a large number of measurements may be recorded in a single run of the housing to give a more complete log of the borehole configuration or dimensions than was heretofore obtainable.

The foregoing description has been given for clearness of understanding only, and no unnecessary limitation should be implied therein or inferred therefrom, for it will be apparent to those skilled in the art that variations and changes may be made in the present system without departing from the spirit and scope of the appended claims. For example, by substituting for the probes various other condition responsive devices operative with the movable-contacts, the system of the present invention can be applied for measuring and recording other variable subsurface physical conditions or quantities such, for example, as: the pressure or temperature in a borehole, the nature, composition, viscosity or salinity of the fluid therein; fluid flow rate; the points of entry of a contaminating fluid; spontaneous potentials; variations in the force of gravity, etc.

I claim as my invention:

1. A system for recording changes in a variable subsurface condition comprising a subsurface sensing unit and a surface recording unit, said subsurface sensing unit comprising a helical contact mounted for rotation about its axis, a fixed reference contact and a plurality of movable contacts, said fixed and movable contacts being spaced in fixed angular positions around the periphery of the rotary path of the helical contact, means responsive to changes in the variable subsurface condition for displacing said movable contacts axially of said helical contact and proportionally to said changes, means for rotating said helical contact whereby said helical contact cyclically closes with said reference and said movable contacts, and said surface recording unit having two recording contacts, one of said recording contacts being rotatable with regard to the other, means for rotating said one recording contact at a speed synchronized with the rotary speed of said helical contact, and electrical circuit means connecting the subsurface and surface units whereby an electric current is passed between said recording contacts only during the closing of said helical contact with said subsurface reference and movable contacts.

2. A system for recording changes in a variable subsurface condition comprising a subsurface sensing unit and a surface recording unit, said subsurface sensing unit comprising a first helical contact mounted for rotation about its axis, a fixed reference contact and a plurality of movable contacts, said fixed and movable contacts being spaced in fixed angular positions around the periphery of the rotary path of the first helical contact, means responsive to changes in the variable subsurface condition for displacing said movable contacts axially of said first helical contact and proportionally to said changes, first motor means for rotating said first helical contact whereby said first helical contact cyclically closes with said reference and said movable contacts in sequence, said surface recording unit comprising two recording contacts, one of said recording contacts being a second helical contact mounted for rotation about its axis, the other of said recording contacts being a fixed contact extending the length of the second helical contact and arranged parallel to said axis of rotation whereby the second helical contact continuously electrically intersects the fixed recording contact, second motor means for rotating said second helical contact at a speed synchronized with the rotary speed of the first helical contact, and an electrical circuit for energizing both said motor means, said circuit comprising a source of electric current and conductor means connecting said source of electric current and the subsurface and surface units in such a manner that an electric current is passed between said recording contacts only during the closing of said first helical contact with said reference and said movable subsurface contacts.

3. The apparatus of claim 2 wherein said second helical contact has a length longer than one pitch length and wherein the first and second helical contacts are rotated in phase such that when the first helical contact closes with the fixed reference contact the fixed recording contact is simultaneously electrically intersected by opposite end portions of the second helical contact.

4. The apparatus of claim 2 including a casing for housing said subsurface sensing unit and wherein said means responsive to changes in the variable subsurface condition comprise a plurality of probes, each of said probes being pivotally attached to said housing and having a first end swingable radially outwardly of the housing for engaging the wall of a borehole, and each of said probes having a second end connected by a linking mechanism to a separate one of said movable contacts for displacing the contact axially of the first helical contact proportionally to the radial position of the first end of the probe.

5. The apparatus of claim 4 including at least four movable contacts and four probes, a separate spring for urging each of said probes radially outwardly of the casing, at least two of said movable contacts and their respective probes being disposed in diametrically opposed positions, and the springs associated with said two diametrically opposed probes having a greater strength than the springs associated with the other probes.

6. A system for recording the dimensions of a borehole and having a subsurface detecting unit and a surface recording unit, said subsurface detecting unit comprising a housing movable through a borehole, a first drum mounted for rotation about its axis in said housing, a first helical contact carried on the outer surface of said first drum and arranged for coaxial rotation therewith, a fixed reference contact and a plurality of movable contacts carried by said housing and engageable with said first helical contact, said fixed and movable contacts being spaced in fixed angular positions around the periphery of said first drum, means responsive to variations in the configuration of a borehole wall for displacing said movable contacts axially of said first helical contact and proportionally to said variations, first motor means carried by said housing for rotating said first drum whereby said first helical contact cyclically closes with said reference and said movable contacts, said surface recording unit comprising a second drum mounted for rotation about its axis, a second helical recorder contact carried on the outer surface of said second drum and arranged coaxially for rotation therewith, a fixed recorder contact extending the length of the second helical recorder contact and arranged parallel to its axis of rotation whereby the second helical recorder contact continuously electrically intersects the fixed recorder contact, second motor means for rotating said second drum and second helical recorder contact at a speed synchronized with the rotary speed of the first helical contact, and an electrical circuit for energizing both said motor means, said circuit comprising a source of current and conductor means connecting said source and the subsurface and surface contacts in such a manner that an electric current is passed between said recording contacts only during the closing of said first helical contact with said reference and said movable subsurface contacts.

7. The apparatus of claim 6 wherein the subsurface reference and movable contacts and the surface fixed recording contact are electrically grounded, and wherein the first and second helical contacts are electrically connected to each other and the source of current.

No references cited.